United States Patent
Li et al.

(10) Patent No.: US 9,868,218 B2
(45) Date of Patent: Jan. 16, 2018

(54) GRIPPER MECHANISM

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Xi-Hang Li, Zhengzhou (CN); Zhi-Jun Wang, Zhengzhou (CN); Da Xu, Zhengzhou (CN); Li Zhang, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/364,359

(22) Filed: Nov. 30, 2016

(65) Prior Publication Data

US 2017/0151678 A1 Jun. 1, 2017

(30) Foreign Application Priority Data

Dec. 1, 2015 (CN) .......................... 2015 1 0858935

(51) Int. Cl.
*B25J 15/02* (2006.01)
*B25J 15/10* (2006.01)
*B25J 15/00* (2006.01)

(52) U.S. Cl.
CPC ......... *B25J 15/0028* (2013.01); *B25J 15/022* (2013.01); *B25J 15/106* (2013.01)

(58) Field of Classification Search
CPC .. B25J 15/0028; B25J 15/022; B25J 15/0608; B25J 15/10; B25J 15/0052; B25B 5/122; B66C 1/427; B66C 1/447; B66C 3/16
USPC ............................................ 294/198, 202, 2
See application file for complete search history.

(56) References Cited

U.S. PATENT DOCUMENTS

| | | | | |
|---|---|---|---|---|
| 3,306,646 | A * | 2/1967 | Flora, Jr. ................. | B66C 1/427 294/106 |
| 3,945,676 | A * | 3/1976 | Asamoto .................. | B25J 19/06 294/106 |
| 4,728,137 | A * | 3/1988 | Hamed ................ | B25J 15/0266 269/228 |
| 5,884,952 | A * | 3/1999 | Chadwick .............. | B25J 15/022 294/115 |
| 6,290,210 | B1 * | 9/2001 | Horn ....................... | B23Q 7/043 254/34 |
| 8,132,835 | B2 * | 3/2012 | Ban ....................... | B25J 15/0266 294/183 |
| 2014/0060746 | A1 * | 3/2014 | Lu ......................... | B29C 66/727 156/538 |

* cited by examiner

*Primary Examiner* — Dean J Kramer
(74) *Attorney, Agent, or Firm* — ScienBiziP, P.C.

(57) ABSTRACT

A gripper mechanism configured to clamp an object includes at least one pair of clamping arms, a connecting element hinging at least one pair of clamping arms, a power cylinder driving the connecting element to move, and a limiting element with a through slot. The clamping arms pass through the through slot and connect to the limiting element. The power cylinder can drive the connecting element to move opposite or to move closer, thus (respectively) closing the clamping arms together or causing them to open.

7 Claims, 6 Drawing Sheets

GRIPPER MECHANISM

CROSS-REFERENCE TO RELATED APPLICATIONS

This application claims priority to Chinese Patent Application No. 201510858935.8 filed on Dec. 1, 2015, the contents of which are incorporated by reference herein.

FIELD

The subject matter herein generally relates to object handling and processing.

BACKGROUND

In industrial production process, a task of grabbing or disassembling an object can be accomplished manually. However, the manual operation not only has a low efficiency and high production costs, but also is not beneficial for a company to achieve the goal of production automation.

BRIEF DESCRIPTION OF THE DRAWINGS

Implementations of the present technology will now be described, by way of example only, with reference to the attached figures.

DETAILED DESCRIPTION

Figure 1:
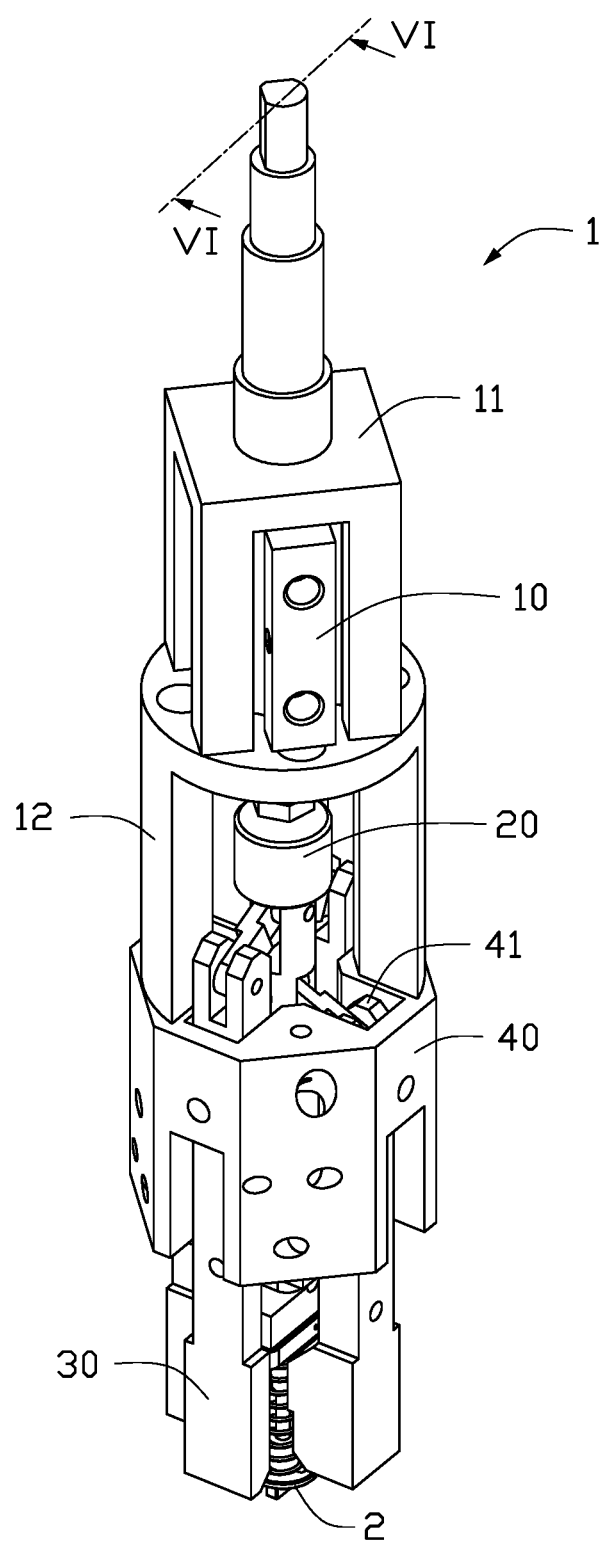
FIG. 1 is a diagrammatic view showing an embodiment of a gripper mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series and the like.

Embodiments of the present disclosure will be described by reference to the accompanying drawings.

Figure 2:
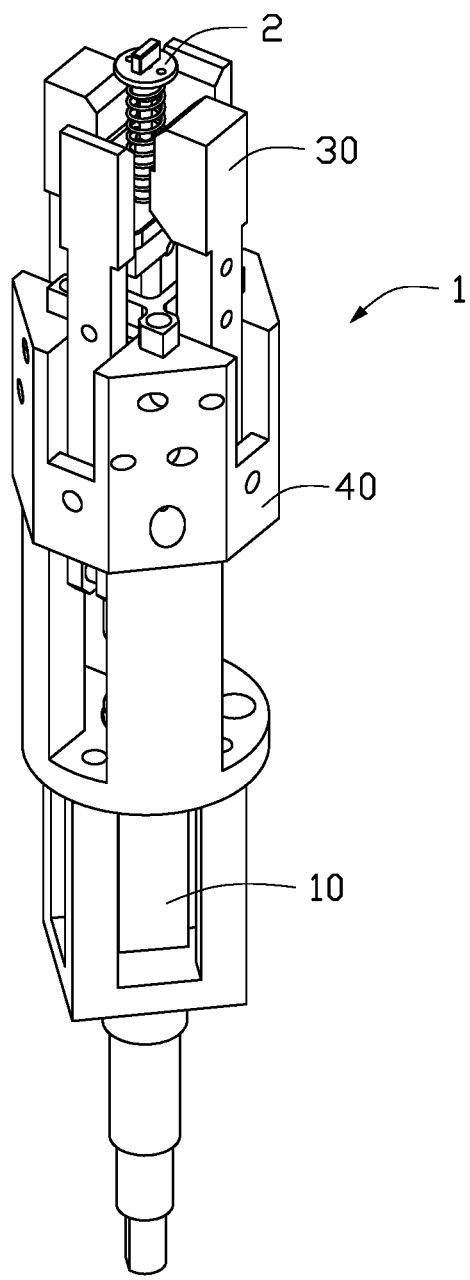
FIG. 2 is another perspective schematic view of the gripper mechanism of FIG. 1.

FIG. 1 illustrates an embodiment of a gripper mechanism 1. The gripper mechanism 1 can clamp an object 2. FIG. 2 illustrates the gripper mechanism 1 from another perspective. The gripper mechanism 1 includes a power cylinder 10, a connecting element 20 connected to the power cylinder 10, at least one pair of clamping arms 30, and a limiting element 40. The connecting element 20 forms a hinge between the at least one pair of clamping arms 30, and the clamping arms 30 are symmetrical about the connecting element 20. The limiting element 40 defines a through slot 41. The clamping arms 30 pass through the through slot 41 and can rotatably connect to the limiting element 40. When the power cylinder 10 drives the connecting element 20 to move toward to the power cylinder 10, the connecting element 20 drives an end of each clamping arm 30 closer to each other, which makes the other end of each of the clamping arms 30 open outward. When the power cylinder 10 drives the connecting element 20 to move opposite from the power cylinder 10, the connecting element 20 drives an end of each clamping arm 30 opposite from each other, which makes the other end of each clamping arm 30 close inwardly.

Figure 3:
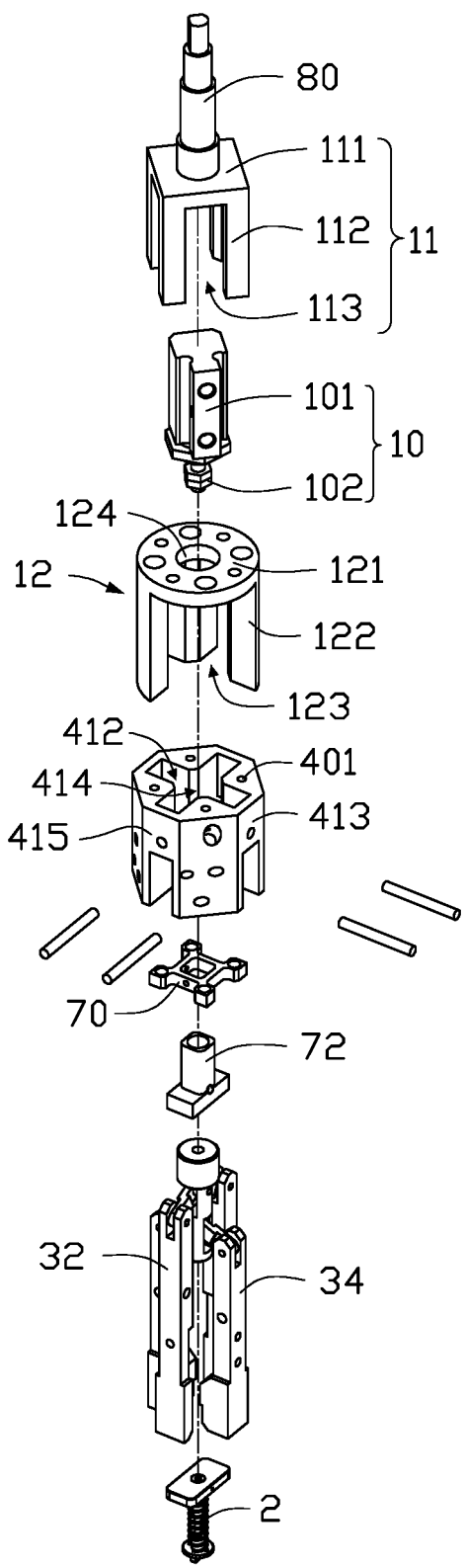
FIG. 3 is an exploded, isometric view of the gripper mechanism of FIG. 1.

FIG. 3 shows an exploded view of the gripper mechanism 1. In at least one embodiment, the gripper mechanism 1 includes a first mounting bracket 11 and a second mounting bracket 12. The second mounting bracket 12 connects to the first mounting bracket 11. The first mounting bracket 11 includes a first mounting plate 111 and at least two first arms 112. The first arms 112 are perpendicular to the first mounting plate 111, and extend from side edges of the first mounting plate 111. The at least two first arms 112 define a first receiving space 113. The power cylinder 10 can be mounted on the first mounting plate 111 and received in the first receiving space 113. The power cylinder 10 includes a main body 101 and at least one movable rod 102. The at least one movable rod 102 can move into or out of the main body 101.

Figure 4:
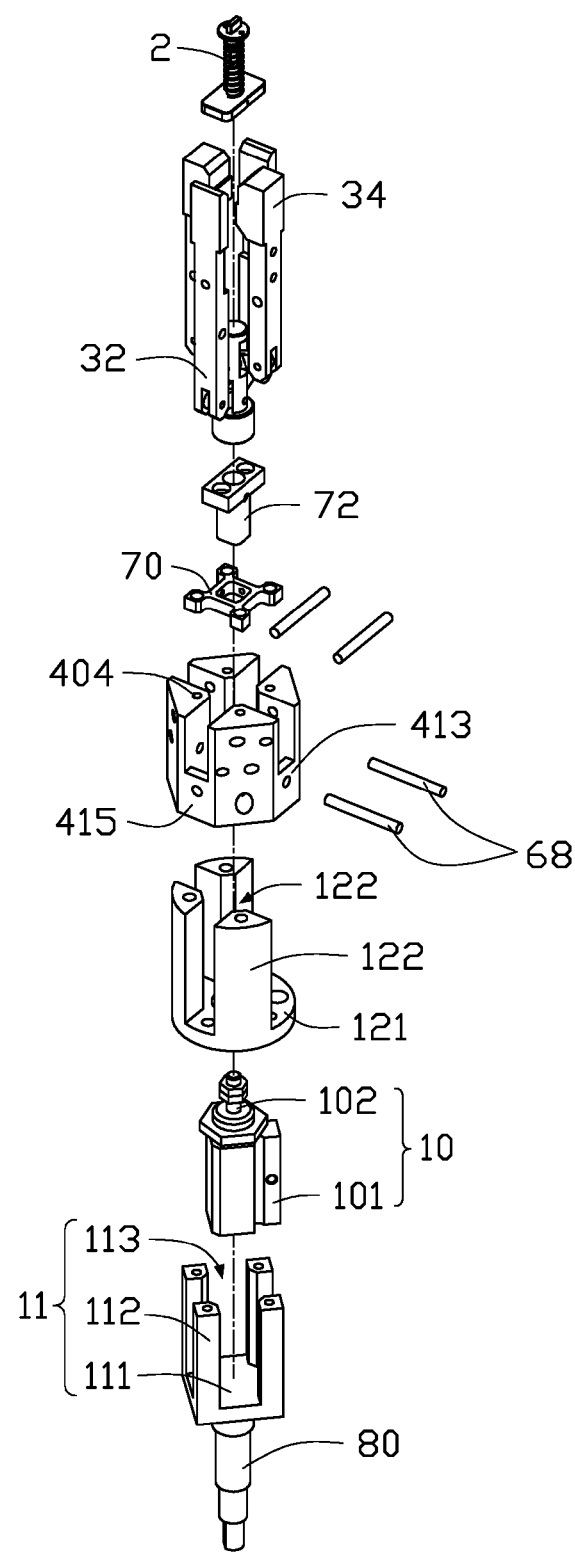
FIG. 4 is an exploded, isometric view of the gripper mechanism of FIG. 2.

FIG. 4 also illustrates the gripper mechanism 1. The second mounting bracket 12 includes a second mounting plate 121 and at least two second arms 122. The second arms 122 are perpendicular to the second mounting plate 121, and extend from side edges of the second mounting plate 121. The first arms 112 of the first mounting bracket 11 are arranged on the second mounting plate 121. The second arms 122 define a second receiving space 123. The connecting element 20 can be received in the second receiving space 123 and can move into the second receiving space 123 when driven by the power cylinder 10. The second mounting plate 121 defines a through hole 124. The movable rod 102 passes through the through hole 124 of the second mounting plate 121 and connects to the connecting element 20.

Figure 5:
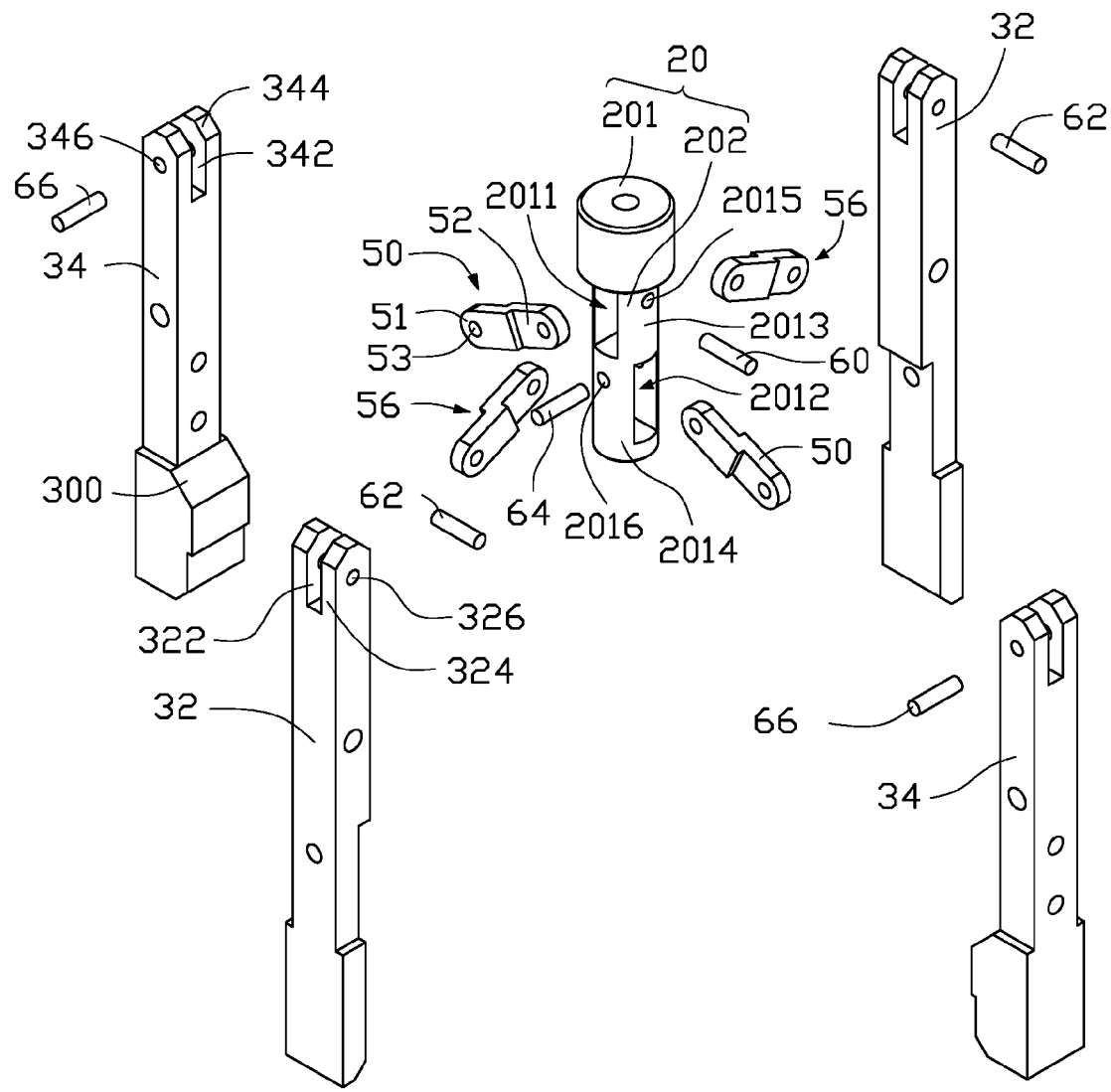
FIG. 5 is an exploded, isometric, partial view showing a connecting element and a number of clamping arms of the gripper mechanism of FIG. 1.

FIG. 5 shows the connecting element 20 and a number of clamping arms 30. The connecting element 20 includes a first cylindrical block 201 and a second cylindrical block 202 coaxial with the first cylindrical block 201. The movable rod 102 of the power cylinder 10 connects to the first cylindrical block 201. The second cylindrical block 202 defines a first slot 2011 and a second slot 2012. The first slot 2011 is perpendicular to the second slot 2012. The first slot 2011 is defined by two opposing first slot walls 2013. The second slot 2012 is defined by two opposite second slot walls 2014.

In at least one embodiment, the gripper mechanism 1 includes a pair of a first clamping arms 32 and a pair of a second clamping arms 34. One end of each first clamping arm 32, which is opposite from the connecting element 20, and one end of each second clamping arm 34 which is opposite from the connecting element 20 define a hook 300.

The pair of the first clamping arms 32 can coordinate with the pair of the second clamping arms 34 to grab the object 2.

In at least one embodiment, the gripper mechanism 1 includes a pair of first hinges 50 and a pair of second hinges 56. The first hinges 50 and the second hinges 56 have the same structure. Each first hinge 50 corresponds to one first clamping arm 32 and each second hinge 56 corresponds to one second clamping arm 34. One end 52 of the first hinge 50 is rotatably hinged in the first slot 2011. The other end 51 of the first hinge 50 rotatably connects to one first clamping arm 32, thus a pair of the first clamping arms 32 hinge to the connecting element 20 via a pair of first hinges 50. One end of each second hinge 56 is rotatably hinged between the two second slot walls 2014 of the second slot 2012. The other end of each second hinge 56 rotatably connects to one second clamping arm 34, thus the pair of the second clamping arms 34 hinges with the connecting element 20 via the pair of second hinges 56.

In at least one embodiment, each first slot wall 2013 of the connecting element 20 defines a first through hole 2015. The first hinge 50 and the second hinge 56 both include a first end 51 and a second end 52. The first end 51 and the second end 52 both define a second through hole 53. One end of each first clamping arm 32 opposite from the hook 300 defines a first U-shaped slot 322. The first U-shaped slot 322 includes two third slot walls 324. Each third slot wall 324 defines a third through hole 326. The gripper mechanism 1 also includes a first shaft 60 and two second shafts 62. The first shaft 60 passes through the first through hole 2015 of one first slot wall 2013, through each second through hole 53 of the first end 51 of the first hinge 50, and through the first through hole 2015 of the other slot wall 2013, which arranges the first end 51 of each first hinge 50 between the two second slot walls 2014 of the second slot 2012. Thus the first end 51 can rotate around the first shaft 60. Each second shaft 62 passes through the third through hole 326 of one third slot wall 324, through the second through hole 53 of the second end 52 of one first hinge 50, and through the third through hole 326 of the other third slot wall 324, which arranges the second end 52 of each first hinge 50 between the two third slot walls 324 of the first U-shaped slot 322, and enables rotation around the second shaft 62.

Each second slot wall 2014 of the connecting element 20 defines a fourth through hole 2016. One end of each second clamping arm 32 opposite from the hook 300 defines a second U-shaped slot 342. The second U-shaped slot 342 includes two fourth slot walls 344. Each fourth slot wall 344 defines a fifth through hole 346. The gripper mechanism 1 also includes a third shaft 64 and two fourth shafts 66. The third shaft 64 passes through the fourth through hole 2016 of one second slot wall 2014, through each second through hole 53 of the first end 51 of the second hinge 56, and through the fourth through hole 2016 of the other second slot wall 2013, which arranges the first end 51 of each second hinge 56 between the two second slot walls 2014 of the second slot 2012 and enables rotation around the third shaft 64. Each fourth shaft 66 passes through the fifth through hole 346 of one fourth slot wall 344, through the second through hole 53 of the second end 52 of one second hinge 56, and through the fifth through hole 346 of the other fourth slot wall 344, which arranges the second end 52 of each second hinge 56 between the two fourth slot walls 344 of the second U-shaped slot 342 and permits rotation around the fourth shaft 66.

Referring to FIGS. 3 and 4, in at least one embodiment, the top part 401 of the limiting element 40 connects to the at least two second arms 122 of the second mounting bracket 12. The through slot 41 includes a first through slot 412 and a second through slot 414. The first through slot 412 and the second through slot 414 are arranged on the limiting element 40 in the shape of a cross. In at least one embodiment, the gripper mechanism 1 also includes four fifth shafts 68. The first through slot 412 includes two first slot walls 413. The second through slot 414 includes two second slot walls 415. Each first clamping arm 32 passes through the first through slot 412 of the limiting element 40 and is rotatably connected to the first slot wall 413 by one of the fifth turning shafts 68. Each second clamping arm 34 passes through the second through slot 414 of the limiting element 40 and is rotatably connected to the second slot wall 415 by one of the fifth turning shafts 68. In the embodiment, the first through slot 412 can limit the opening angle of the pair of the first clamping arms 32 when the pair of first clamping arms 32 is open. The second limiting through slot 414 can limit the opening angle of the pair of the second clamping arms 34 when the pair of second clamping arms 34 is open.

In at least one embodiment, the bottom part 404 of the limiting element 40 defines a mounting part 70. The mounting part 70 supports a magnetic part 72. The magnetic part 72 can magnetically attract the object 2. In the embodiment, the magnetic part 72 is a magnet.

In at least one embodiment, the gripper mechanism 1 also includes a shaft 80. The shaft 80 connects to the first mounting plate 111 of the first mounting bracket 11. The clamping arms 30 of the gripper mechanism 1 can rotate around the shaft 80 when the shaft 80 is rotated by a driving unit (not shown).

Figure 6:
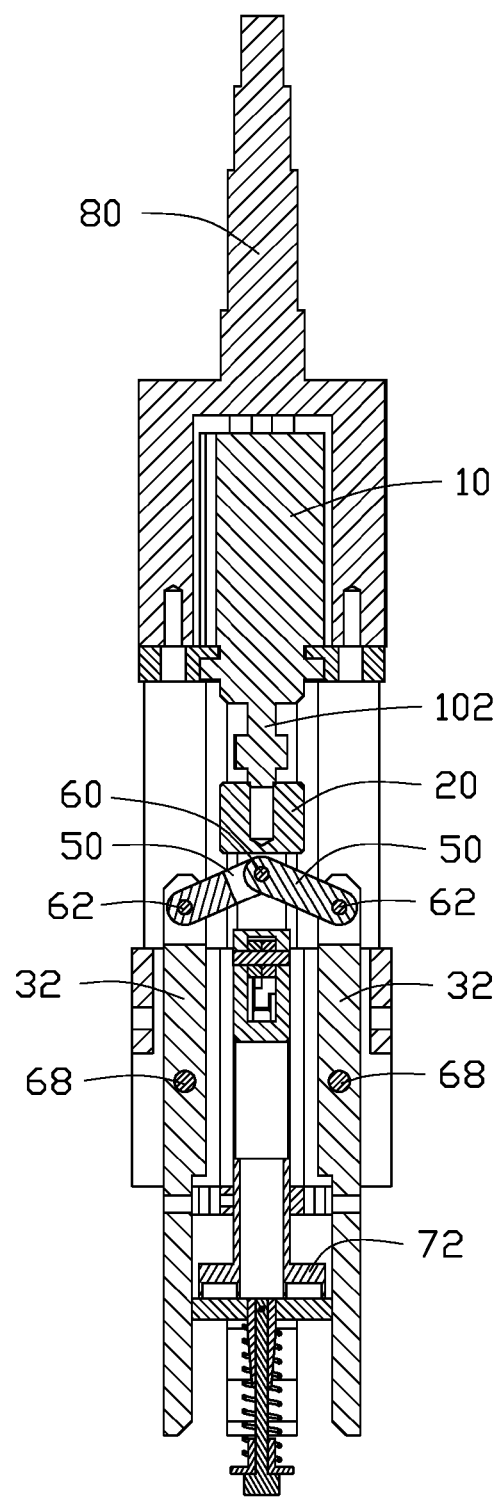
FIG. 6 is a sectional isometric view of the gripper mechanism of FIG. 1 along line VI-VI.

FIG. 6 illustrates the gripper mechanism 1 sectioned along line VI-VI of FIG. 1. The gripper mechanism 1 includes a processing unit (not shown). The processing unit is controlled by a program for the working processes of the gripper mechanism 1. The working processes of the gripper mechanism 1 include the power cylinder 10 driving the connecting element 20 to move opposite from the power cylinder 10, the connecting element 20 driving the hook 300 of each first clamping arm 32 and the hook 300 of each second clamping arm 34 to close together (to grab the object 2). The working processes of the gripper mechanism 1 also include the power cylinder 10 driving the connecting element 20 to move toward the direction of the power cylinder 10, the connecting element 20 driving the hook 300 of each first clamping arm 32 and the hook 300 of each second clamping arm 34 to separate (to release the object 2). The magnetic part 72 mounted on the limiting element 40 can simply attract an object 2 magnetically.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A gripper mechanism for clamping an object, the gripper mechanism comprising:
  at least one pair of clamping arms;
  a connecting element configured to hinge to the at least one pair of clamping arms;
  a power cylinder configured to connect to the connecting element and drive the connecting element to move; and a limiting element comprising through slots, the at least one pair of clamping arms passing through the through slots and rotatably connecting to the limiting element, wherein when the power cylinder drives the connecting element to move opposite from the power cylinder, the connecting element drives an end of each clamping arm opposite from each other, which makes the other end of each clamping arm close inwardly to grab the object, and when the power cylinder drives the connecting element to move toward to the power cylinder, the connecting element drives an end of each clamping arm closer to each other, which makes the other end of each of the clamping arms open outward to release the object, wherein the power cylinder comprises a main body and one movable rod at one end of the main body, the movable rod connects to the connecting element and is driven to move into or out of the main body, the connecting element comprises a first cylindrical block and a second cylindrical block coaxial with the first cylindrical block, the first cylindrical block connects to the movable rod of the power cylinder, the second cylindrical block comprises a first slot and a second slot, the first slot is defined by two first slot walls, the second slot is defined by two second slot walls.

2. The gripper mechanism according to claim 1, wherein the gripper mechanism comprises a pair of first hinges and a pair of second hinges, the clamping arms comprise a pair of first clamping arms and a pair of second clamping arms, one end of each first hinge is rotatably hinged between the two first slot walls of the first slot, the other end of each first hinge rotatably connects to one first clamping arm; one end of each second hinge is rotatably hinged between the two second slot walls of the second slot, the other end of each second hinge rotatably connects to one second clamping arm.

3. The gripper mechanism according to claim 2, further comprising a first mounting bracket, wherein the first mounting bracket comprises a first mounting plate and at least two first arms, the at least two first arms are substantially perpendicular to the first mounting plate and extend from side edges of the first mounting plate, the at least two first arms defines a first receiving space for receiving the power cylinder.

4. The gripper mechanism according to claim 3, wherein the through slots comprise a first through slot and a second through slot, the first through slot and the second through slot are arranged on the limiting element in the shape of a cross.

5. The gripper mechanism according to claim 4, wherein, the first through slot comprises two first slot walls, the second through slot comprises two second slot walls, each first clamping arm passes through the first through slot and is rotatably connected to the corresponding first slot wall, each second clamping arm passes through the second through slot and is rotatably connected to the corresponding second slot wall.

6. The gripper mechanism according to claim 1, wherein a mounting part is arranged on the bottom part of the limiting element, the mounting part is configured to attract the object.

7. The gripper mechanism according to claim 1, wherein the end of each of clamping arms opposite from the connecting element defines a hook.

* * * * *